US008601020B2

(12) United States Patent
Valk (10) Patent No.: US 8,601,020 B2
(45) Date of Patent: Dec. 3, 2013

(54) METHOD AND SYSTEM IN COMMUNICATION DEVICES FOR PRE SELECTED PARTNER SEARCH

(76) Inventor: Jentje Auke Valk, Molkwerum (NL)

( * ) Notice: Subject to any disclaimer, the term of this patent is extended or adjusted under 35 U.S.C. 154(b) by 1558 days.

(21) Appl. No.: 11/115,233

(22) Filed: Apr. 27, 2005

(65) Prior Publication Data

US 2005/0188010 A1    Aug. 25, 2005

(30) Foreign Application Priority Data

Nov. 5, 2002 (NL) .................................. 1021841
Aug. 20, 2003 (NL) .................................. 1024130
Nov. 3, 2003 (WO) ..................... PCT/NL03/00759

(51) Int. Cl.
*G06F 7/00* (2006.01)

(52) U.S. Cl.
USPC ............ 707/770; 709/202; 709/212; 709/213

(58) Field of Classification Search
USPC .............. 707/770, 999.01, 999.001, 999.002, 707/999.003
See application file for complete search history.

(56) References Cited

U.S. PATENT DOCUMENTS

| | | | | |
|---|---|---|---|---|
| 6,670,968 | B1 * | 12/2003 | Schilit et al. .................. | 715/760 |
| 6,832,242 | B2 * | 12/2004 | Keskar .......................... | 709/204 |
| 6,968,179 | B1 * | 11/2005 | De Vries .................... | 455/414.1 |
| 7,260,646 | B1 * | 8/2007 | Stefanik et al. ............... | 709/238 |
| 2002/0154163 | A1 * | 10/2002 | Melchner ....................... | 345/749 |
| 2003/0228842 | A1 * | 12/2003 | Heinonen et al. ............. | 455/41.2 |
| 2004/0003133 | A1 * | 1/2004 | Pradhan et al. ............... | 709/318 |
| 2004/0043758 | A1 * | 3/2004 | Sorvari et al. .............. | 455/414.1 |
| 2004/0203768 | A1 * | 10/2004 | Ylitalo et al. .............. | 455/435.1 |

FOREIGN PATENT DOCUMENTS

| | | |
|---|---|---|
| DE | 29818638 | 10/1998 |
| DE | 29904686 | 6/1999 |
| DE | 19929186 | 12/2000 |
| DE | 19929188 | 1/2001 |

OTHER PUBLICATIONS

International Search Report for PCT/NL2003/000759 filed on Nov. 3, 2003 in the name of Jentje Auke Valk.

* cited by examiner

*Primary Examiner* — Amy Ng
(74) *Attorney, Agent, or Firm* — Steinfl & Bruno, LLP (57) ABSTRACT

A portable wireless hard- and software driven communication device is equipped with a software application for building and storing in memory of the communication device a customized encoded data string from inputted user-specific profile data. The portable communication device automatically transmits the customized encoded data string to portable communication devices equipped with the software application in a wireless communication network. A communication device automatically receives transmitted customized encoded data strings and stores same in memory of the communication device. A message is provided at an output of the portable communication device based on searching and matching of received and stored customized encoded data. The software application provides for direct personal contact between users having matching profile data.

30 Claims, 9 Drawing Sheets

Function key 'START/STOP':

Application

MENU1
  item1
  item2
  -
  -
  itemX MENU2
item1
item2
-
itemY MENUn
item1
item2
-
itemZ

METHOD AND SYSTEM IN COMMUNICATION DEVICES FOR PRE SELECTED PARTNER SEARCH

BACKGROUND OF THE INVENTION

One can notice that people are in the urgent need for a system for dedicated partner search and selection offering direct, real time, personal contact. Especially in all places where people gather there is an urgent need for direct, real time, personal contact by a system for partner search and selection in their nearby situation, actually to solve their problem. A partner or issue has been defined as a person, company or item like a product, service, information etc. The invention launches a new method of literally entering the problem into the system here communication device and the device finds a solution after a new fully automatic search and selection operation. In case of a mobile phone the problem has been entered via the normal interface for example by keypad or speech and the mobile phone finds the solution rather then entering a known phone number to solve the problem. The invention uniquely turns the mobile phone into a new and intelligent problem solving device rather than the old dull, 'given-number' dialing gear. A breakthru in connecting people: not only calling with known persons to try to solve your problem but also explore new relationships and extending your circle of friends. A communication device such as a mobile phone equipped with the invention uniquely covers the hole range in communication: search-dialing-connect. The invention is a new number one network tool: gathering new information and widening your circle of relationships while entering into new relationships. More in particular one can notice that in all places where people gather there is an urgent need for direct contact by a system for personal search and selection of different issues in any place, including their nearby situation, also called local area also called short range. Conventional methods and systems do not provide in direct, real time partner search and selection in a local area merely because of the use of cumbersome central databases in written, printed or digital format, with poor search and selection resulting in the known privacy violating, disappointing, time and money wasting, time consuming process of conventional (business)partner search. The invention creates a lifestyle of freedom; the user of a portable communication device equipped with the application, decides when and where in his local area, to find a (business)partner. Also to be used at short range purposes on all places where people gather: study, work, leisure, fun stroll- and hang-around area like: festivals, amusement parks, funfairs, carnival, TV-shows, (trade) exhibitions, conferences, seminars, school, university, beach, shopping, night live, disco, concerts, network meetings, job search, auctions, sales shows etc. etc.

Advantageous effects compared with current methods:
  Free life style, independent, live at the event, hot spot method while implemented on a personal mobile device,
  Also to be used for entertainment,
  When in the mood: the user decides where and when to start the application,
  Distributed database with wireless access: no expensive central databases and data management,
  Direct search in a local area: immediate on the spot contact,
  No (psychological) threshold: the application announces only successful reports and 'Start for Free, Pay Later',
  Event specific, automatically adapted application,
  Easy to start by a few keystrokes,
  Dynamic: after action immediate reaction,
  Reliable and high quality: detailed, tailored and dedicated search and selection,
  Privacy guaranteed:
    Every user keeps his/her own data on his/her communication device,
    The user specific data stored on/his communication device will be managed by the user him/herself.
    No cumbersome or privacy violating scrolling through personal or product data,
  High success rate: time and disappointment saving,
  Fully automatic.

BRIEF SUMMARY OF THE INVENTION

The invention relates to a method and system in communication devices for dedicated partner search and selection. More in particular the invention also relates to business partner search and the use of suitable portable wireless communication devices for such purposes.

A portable wireless communication device for real time matching of personal profiles stored in every user's device as a distributed database with wireless access, in a nearby situation (local area) for direct personal contact.

The invention performs an easy and dedicated, automatic search and selection of a (business)partner, using a modem, inventive portable mobile communication concept, combining and integrating (known) systems, resulting in a surplus value, in order to cancel the well known problems of conventional search. The invention, in case of a mobile phone, newly extends the communication range from dialing connect into enter problem-search-dialing-connect and changes the mobile phone from a dull 'given-number' device into a powerful problem solving search engine. The invention literally allows entering of the problem into the communication device and the device for example a mobile phone finds a solution. In case of a mobile phone the problem has been entered via the normal interface for example by keypad or speech and the mobile phone finds the solution rather then entering a known phone number to solve the problem. In this method and system the data has been distributed over all (portable mobile) communication devices. Every user keeps the personal data on his/her personal (portable mobile) communication device. Management of the personal data occurs by the user personal.

DETAILED DESCRIPTION OF THE INVENTION

The invention has been illustrated as a dual mode mobile phone provided with the new partially exchangeable application of the invention, in this example for menu driven data entry, unique, fully automatic switching to the new second mode, herein implemented as short range radio communication functions and technology for unique data exchange in a local area, transceiving of special customized data, with an unique algorithm for filtering, matching and a messaging (image, sound, data) function.

A portable wireless communication device with an unique method for real time matching of personal profiles stored as a spread (distributed) database with wireless access, in a nearby situation (local area) herein also illustrated by a single mode radio device for example implemented as short range radio communication functions and technology, provided with a special application for menu driven data entry, transceiving of special customized data in a local area, with an algorithm for filtering, matching and a messaging (image, sound, data) function.

In both the dual as the single mode solution there is no need for a conventional central databases: The data of the personal profiles will be uniquely spread over all devices equipped with the hard- and software of the invention, in a so called distributed database. In the second or local area mode for multipoint to multipoint communication the device uniquely navigates wireless though all the distributed databases while tailoring data to user's precise need.

Above, as noticed, the invention has been described as a mobile phone utility program and a stand alone radio device application and in this example performed with menu driven entry of the special data. It must be clear that these examples are a vehicle to describe the invention because the claimed invention might be implemented in many other (portable, handheld) communication devices as well as the Internet. Also for reasons of explanation, in the described dual and single mode solutions hereunder, the number of transceiving devices has been limited to two devices X and Y.

As said before: for reasons of explanation the invention hereunder has been described as a method and system implemented on a normal mobile phone: a wireless portable communication device also equipped with the well known normal cellular network services. The device allows user controlled input of a user-specific data. The data stored on his/her mobile phone will be managed by the user him/herself. In this invention the data has been distributed over all mobile phones equipped the same method and system. The data spread over all mobile phones build the distributed database with wireless access. Access of the distributed database is managed by the hard- and software of the application for searching and matching. Under control of invention's special application, the device has been able to switch to a second mode, existing of normal short range radio communication functions and technology which provides simultaneously multi-point to multi-point transmitting and receiving of data in a local area. Consider N devices equipped with the invention, multipoint to multi-point transmitting and receiving of the special data (further also called 'data') in a local area.

This stands for device 1: transmitting of data to N−1 devices (device 2 to N) and receiving of data from N−1 (device 2 up to N) devices; for device 2: transmitting of data to N−1 devices (device 1, 3 up to N) and receiving of data from N−1 (device 1, 3 up to N) devices; for device N−1: transmitting of data to N−1 devices (device 1 up to N−2, N) and receiving of data from N−1 (device 1 up to N−2,N) devices etc. (FIG. 8) FIG. 9 shows the random nature of the multi-point to multi-point data transceiving for N devices.

The device has been equipped with an algorithm for searching, filtering and data matching.

If the device has received matching data the device switches to the mode for normal cellular services while representing personal data also including the issue name and corresponding phone number.

After matching and displaying of data, the user of the device has the ability of dialing the phone number via the cellular network.

Solutions:

A menu driven method and system, providing both private or business variants, as a feature for a handheld communication device for user controlled data and command entry via a keyboard or numeric keypad, short range and low power radio data transceiving in for example an unlicenced frequency band, between similarly equipped devices, filtering and matching of data and generating a message (image, sound, data).

A modern portable personal mobile communication device to keep just the data of the user.

For example implemented as a feature/function on a "walkie-talkie" (semaphore), 27MC, mobile phone, pager, Personal Digital Assistant (PDA), laptop, handheld PC, palmtop PC and similar portable devices. If the application has been implemented on handheld devices like a semaphore, a single mode transceiver function will do. As described above different solutions of the invention concept are conceivable. As an illustration three solutions (applications) have been described: dual mode solution, single mode solution and an internet solution.

Dual Mode Solution:

A hard- and software driven communication device having the hard- and/or software of the special application includes a configuration for performing of both normal mobile phone cellular network services as well as a second, additional short range radio mode for example implemented as Frequency Division Duplexing (FDD) for direct communication in a local area with similar remote devices. The short range radio technology allows the device simultaneously transmitting and receiving of the special data in a for example unlicensed frequency band like 27MC.

The device combines normal (digital) mobile phone cellular network services and technology and short range radio communication functions and technology in an fully automatic, by the application controlled, dual communication mode. The menu driven method and system, providing both private or business variants, as a feature for a handheld communication device, like a normal mobile phone, for user controlled entry of the special data for example via a keyboard or numeric keypad. After successfully terminating the menu driven data entry, the system will be able to build the format of the encoded send data. Controlled by the special application the mobile phone switches automatically to the supplementary short range radio operating mode. Simultaneously transmitting and receiving of the data via a short range radio transceiver. After receiving, filtering and matching of the data, the device will be able to generate a message (image, sound, data).

Single Mode Solution:

A (portable) hard-en software driven communication device having the hard- and/or software of the special application, equipped with short range radio communication functions and technology for example implemented as Frequency Division Duplexing (FDD). Short range radio technology allows the device simultaneously transmitting and receiving of data in a for example unlicenced frequency band like 27 MC. For example implemented as a feature/function on a "walkie-talkie" (semaphore) and similar portable devices.

The menu driven method and system, providing both private and/or business applications/variants, as a feature for a portable, hand held short range radio device, for user controlled data entry in this example via a keyboard or numeric keypad and matching of the data.

After successfully terminating the menu driven data entry, the system will be able to build the format of the encoded send data. Simultaneously transmitting and receiving of the data via a short range radio transceiver. After receiving, filtering and matching of the data, the device will be able to generate a message (image, sound, data) for displaying.

Internet Solution:

A website having the special application of the invention for (business)partner search and selection as a substitute for the long-winded, privacy violating, profile checking by scrolling all available profiles which current websites in the field of (business)partner search, use to offer.

Method and system: After submitting via a communication device with facilities for Internet access, as a member with an user ID and password, the visitor of the website fills out two forms for each desired category (private, holiday, business etc.); a personal profile and the profile for searching purposes. Intending the personal profile to be downloaded on persons computer while the search profile will be used for the automatic search and matching with all other personal profiles from the category, residing on other submitted computers. If match, both members receive a message in their mailboxes.

Hereunder the invention will be illustrated and disclosed in further detail in terms of:

a) a dual mode wireless and portable communication device, described as a normal mobile phone with known hard- and software architecture for normal cellular services, including a method and system having the special hard- and/or software and equipped with hard- and software to support communication in a short range radio mode.
The input of the special data is user controlled and occurs via the normal mobile phone user interface displaying certain menu options and if matching the message.

b) a single mode wireless and portable communication device, including a method and system having the application of the invention, described as a "walkie-talkie" (hereafter to be called: 'radio device') like device with a known hard- and software architecture for data exchange in a short range radio mode.
The input is user controlled and occurs via a normal keypad and a LCD-screen for displaying certain menu options and a if matching the message.

The presented invention quantities like communication protocols, interface-, menu-, data (code)-structures, content and formats, software schedules and algorithms for filtering, searching, matching, messaging and other functions and operations are chosen for reasons of explanation and illustration of the invention.

As a matter of course a variety of those quantities is conceivable.

Figure 1:
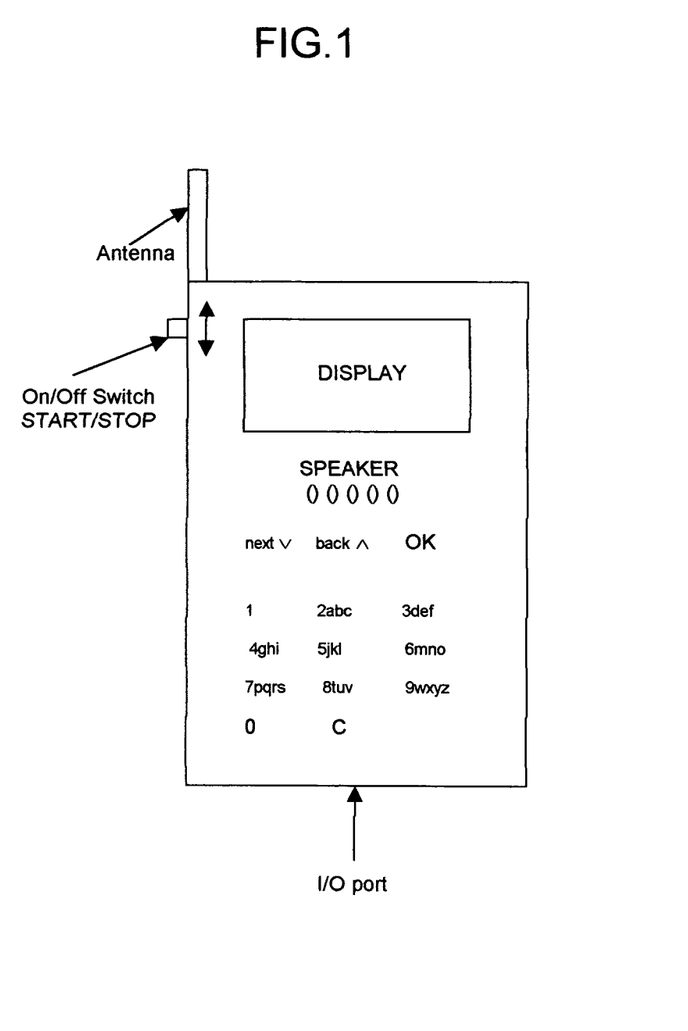
FIG. 1 shows a user input interface.

FIG. 1 shows an example of a radio device user input interface

Figure 2:
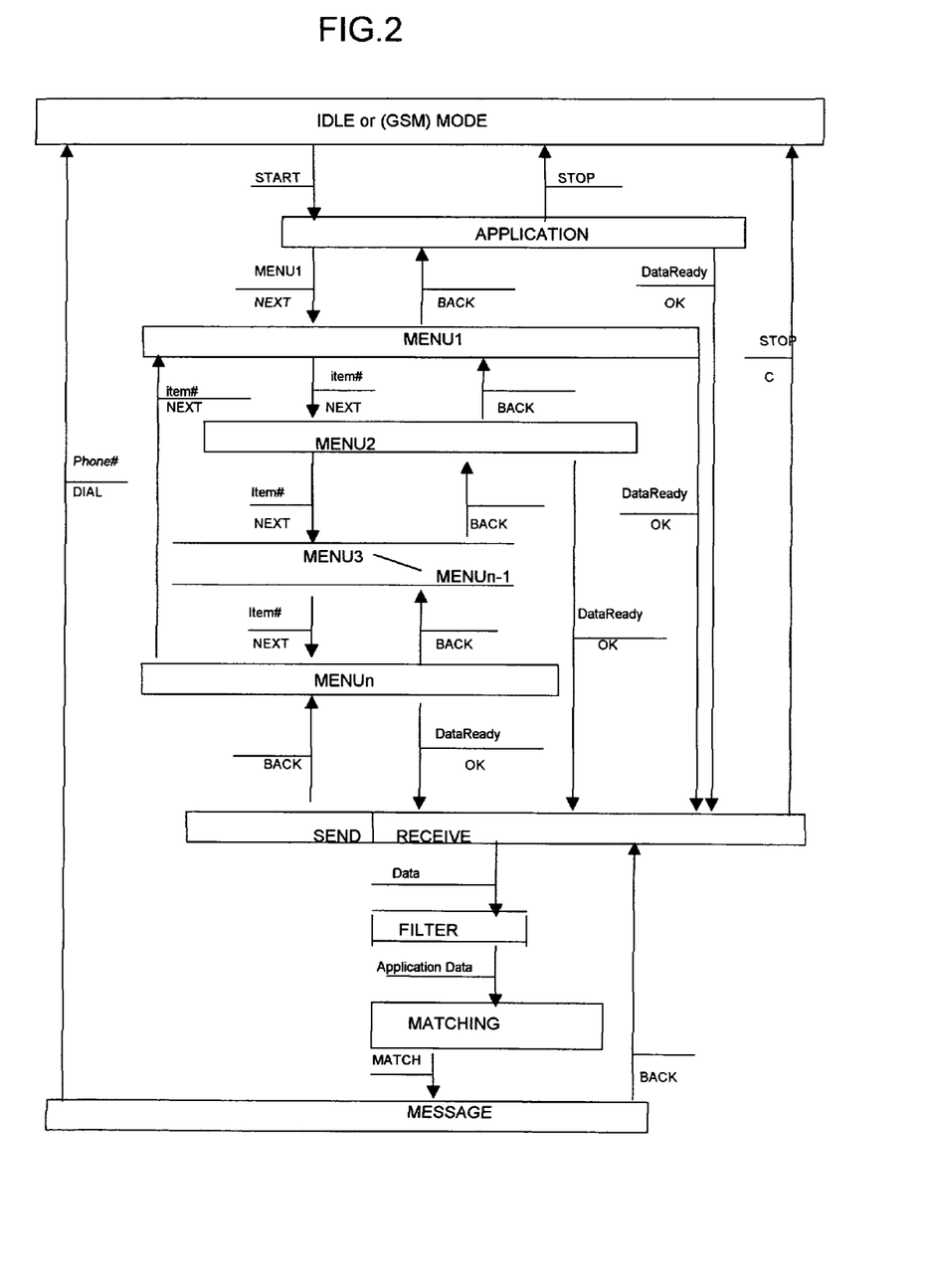
FIG. 2 shows a state transition diagram of the application.

On/Off switch, START/STOP key,

Scroll keys '∧' and '∨' to scroll to the next menu (item) while entering menu choices,

Numeric keys '0', 1, 2abc, 3def, 4ghi, 5jkl, 6 nmo, 7pqrs, 8tuv, 9wxyz for input of the menu item choices, Clear key 'C', backspace 'OK' key for terminating the menu input and start transceiving the profile data in short range radio mode, data filtering, matching and messaging, FIG. 2 shows an example of a state transition diagram of the application.

Explanation:

S = State, T = Transition, C = Condition A = Action

Consider further next description:

START/STOP

DISPLAY "WELCOME to your <special application>"
PRESS NEXT ∨ "

BACK ∧ or NEXT ∨ (menu1: enter name, phone#) or OK character-mode
DISPLAY "ENTER your NAME:" <name><cursor>
NEXT ∨ (enter phone#) or CLEAR (char) or OK numerical-mode
DISPLAY "ENTER your PHONE#:" <phone#><cursor>
BACK ∧ (menu1:enter name) or NEXT (menu2) ∨ or CLEAR (num) or OK DISPLAY "<menu2 content>:ENTRY:" <item#><cursor>
BACK (menu1: phone#) ∧ or NEXT (menu3) ∨ or CLEAR (item# menu2) or OK numerical-mode
DISPLAY "<menu_n content>: ENTRY:" <item#><cursor>
BACK (menun-1)∧ or NEXT (menu1) ∨ or CLEAR (item# menun) or OK to START Send/Receive"

-continued

SEND/RECEIVE DISPLAY "PRESS C to STOP"
DISPLAY: flash mode "LOOKING for your PARTNER"

⇓

FILTERING of received signal (data)
if search data start matching with resident data

⇓

MATCHING
if match then MESSAGE

⇓

MESSAGE
DISPLAY: Image and/or Data and/or Sound
DISPLAY: flash mode "YOU FOUND a PARTNER!"
DISPALY: <name><phone#>

⇓

BACK ∧ (send/receive) or DIAL phone#

Figure 3A:
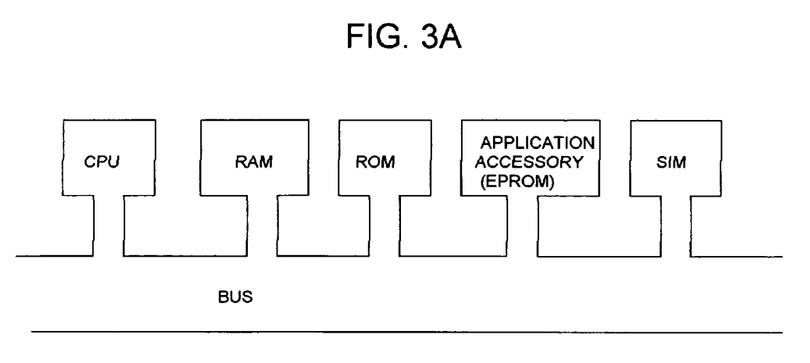
FIG. 3A shows a mobile phone hardware architecture equipped with the application.

FIG. 3A shows an example of a mobile phone hardware architecture equipped with the application.

Figure 3B:
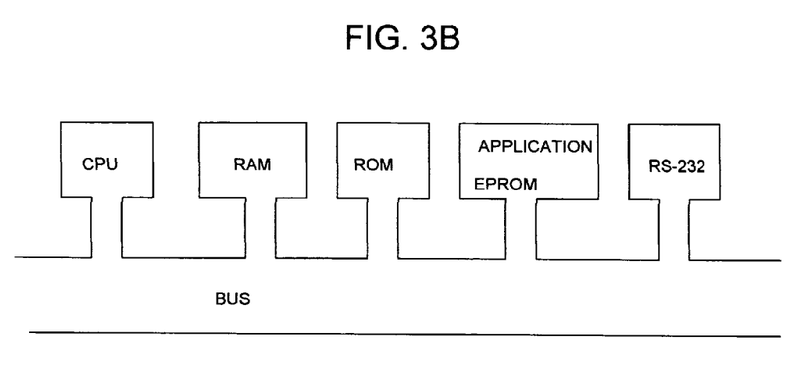
FIG. 3B shows a radio device hardware architecture equipped with the application.

FIG. 3B shows an example of a radio device hardware architecture equipped with the application.

Figure 4:
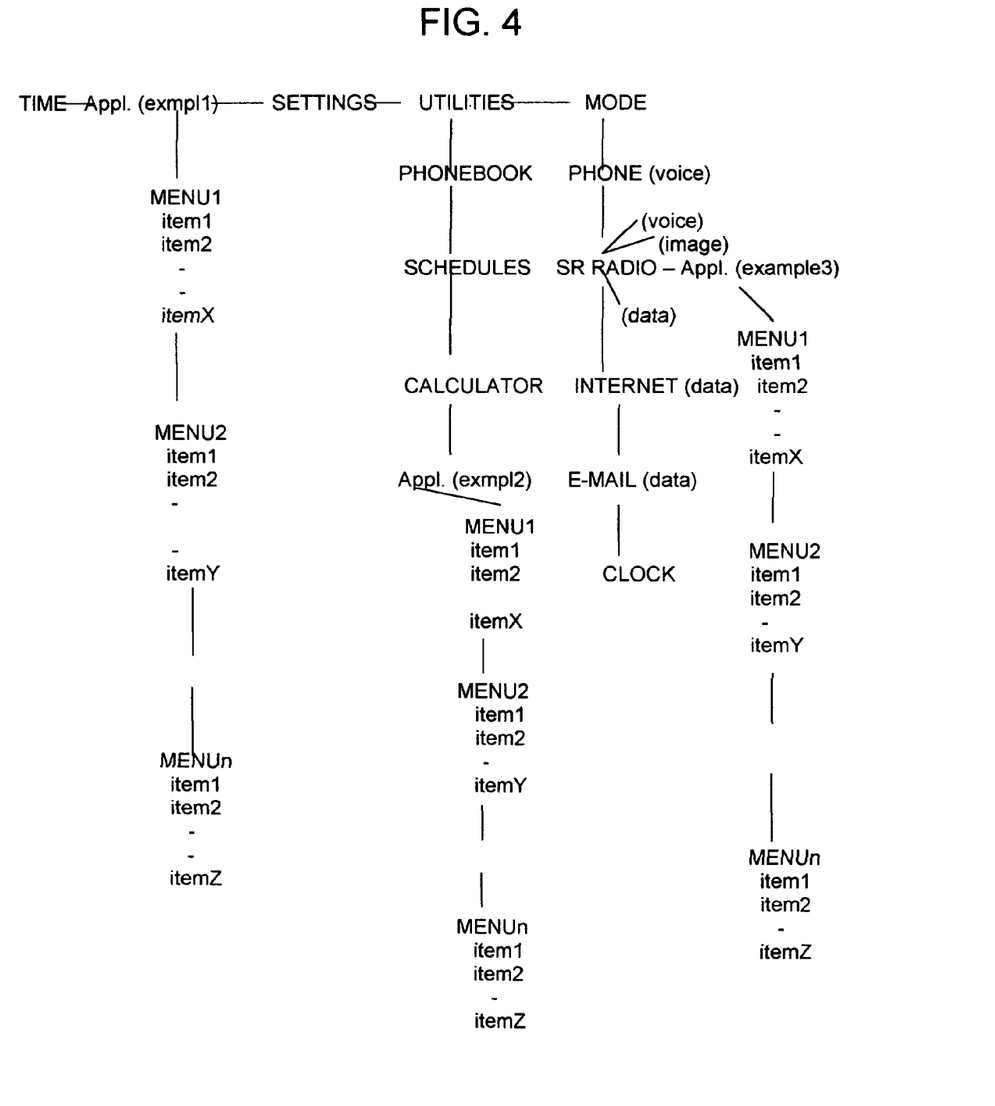
FIG. 4 shows the location of the application in a mobile phone's menu structure in dual mode solution, (3 options)

FIG. 4 shows a examples of a location of the application in mobile phone's menu structure in case of a mobile phone: dual mode solution, (3 examples with 'roll off').

EXAMPLE 1

1) Press function key 'F'
2) Scroll thru the mobile phone functions to the application,
3) Select the application by pressing the relevant (numeric) key,
4) Scroll thru the special menus while selecting menu items by pressing the relevant (numeric) keys
5) Press 'OK' key to terminate the menu input and start transceiving profile data in short range radio mode data filtering, matching and if matching: messaging,
6) Press square key '#' to stop the application.

EXAMPLE 2

1) Press function key 'F'
2) Scroll to 'UTILITIES'
3) Select UTILITIES by pressing the relevant numeric key
4) Scroll to the special utility
5) Select the utility by pressing the relevant numeric key
6) Scroll thru the special menus while selecting menu items by pressing the relevant (numeric) keys
7) Press 'OK' key to terminate the menu input and start transceiving profile data in short range radio mode, data filtering, matching and if matching: messaging,
8) Press square key '#' to stop the utility

EXAMPLE 3

Figure 5:
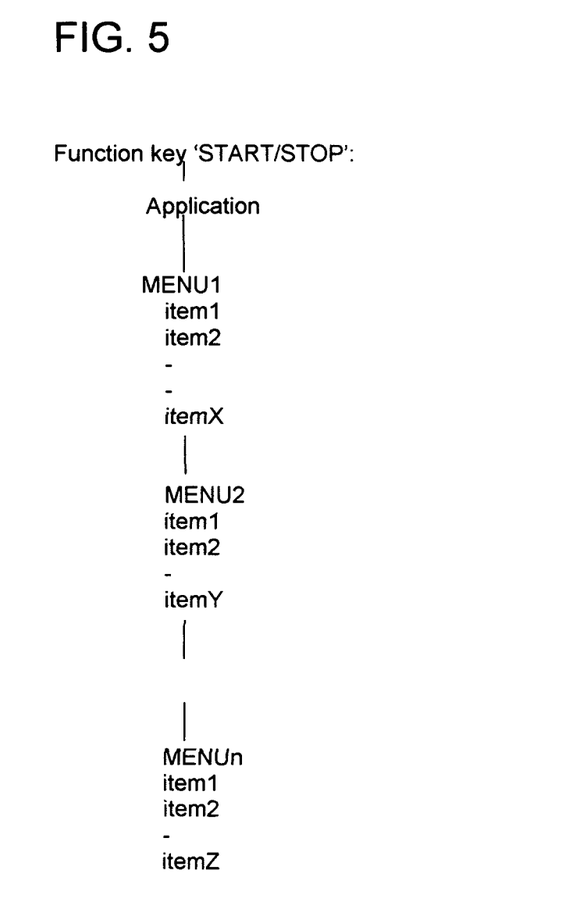
FIG. 5 shows the location of the application in a radio device's menu structure in single mode solution.

1) Press function key 'F'
2) Scroll to MODE
3) Select MODE by pressing the relevant numeric key
4) Scroll to SR Radio MODE
5) Select SR Radio MODE by pressing the relevant numeric key
6) Scroll to the special application
7) Select the application by pressing the relevant numeric key
8) Scroll thru the special menus while selecting menu items by pressing the relevant (numeric) keys
9) Press 'OK' key to terminate the menu input and start transceiving profile data in short range radio mode, data filtering, matching and if matching: messaging,
10) Press square key '#' to stop the application FIG. 5: Location of the application in radio device's menu structure.

The location in case of a radio device: Single mode solution.

1) Press function key 'START/STOP' to switch on radio device and start the application
1) Scroll thru the special menus while selecting menu items by pressing the relevant (numeric) keys
2) Press 'OK' key to terminate the menu input and start transceiving menu character/profile data in short range radio mode, data matching and if matching: messaging,
3) Press function key 'START/STOP'to stop the application and switch off the radio device.

Figure 6:
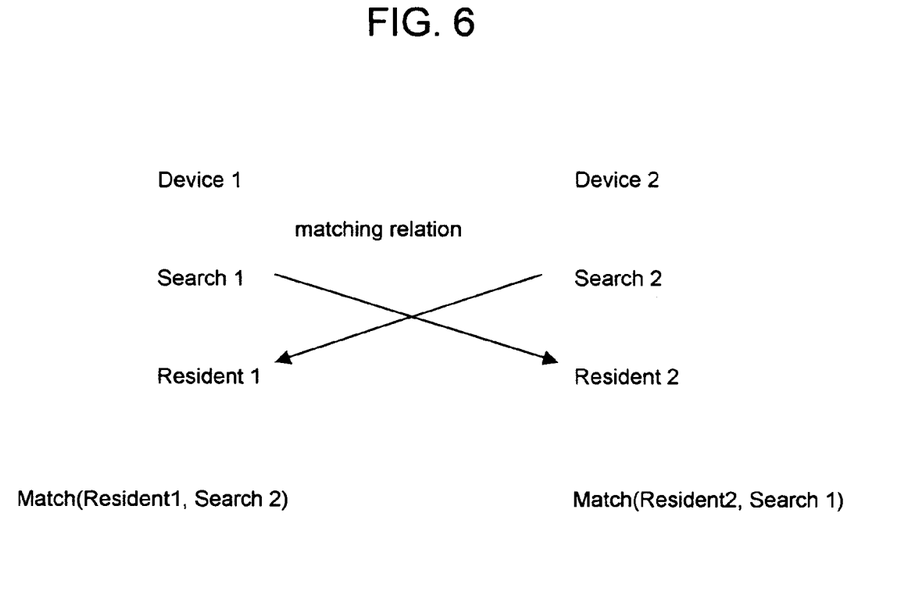
FIG. 6 shows a data matching structure.

FIG. 6: Data Matching structure.

Figure 7:
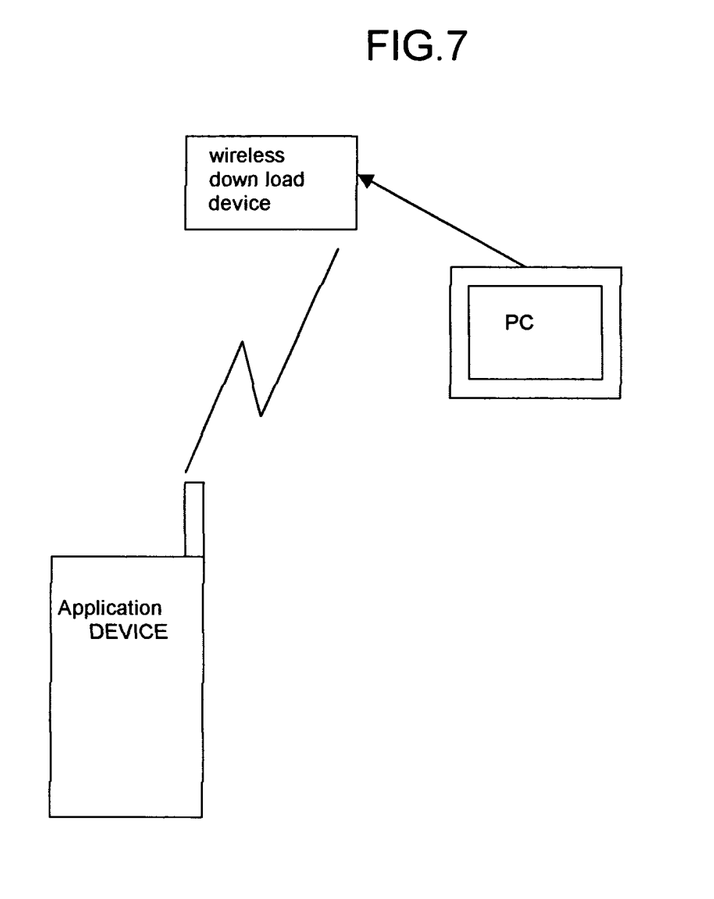
FIG. 7 shows a download configuration.

FIG. 7: Download configuration.

Figure 8:
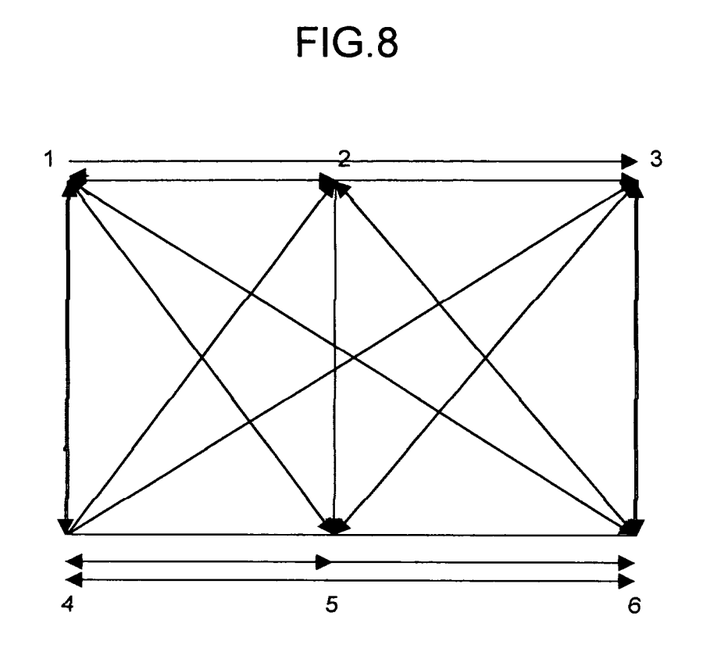
FIG. 8 shows a multipoint to multipoint send/receive, for N=6, N(N−1) combinations.
Figure 9:
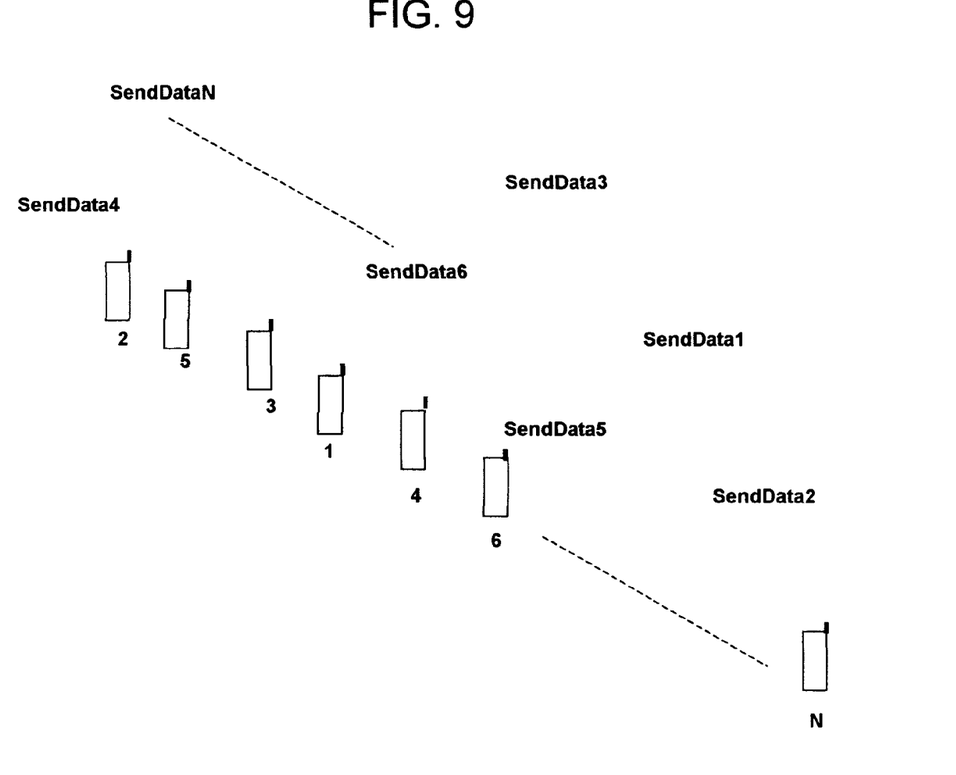
FIG. 9 shows the random nature of the multi-point to multi-point data transceiving for N devices.

FIG. 8: Multipoint to multipoint send/receive for N=6, N(N−1) combinations FIG. 9 shows the complete random nature of the multi-point to multi-point data transceiving for N devices.

Software:

Dual Mode Solution:

The mobile phone X for normal cellular services has in a second, short range radio mode, both the capacity of sending specific data X, build from a menu driven, user-controlled, data entry method as well as receiving of specific data Y from, for example, a mobile phone Y also equipped with the software for (business) partner search and selection in a local area.

Menu Structure:

After starting the application the first menu will appear on the display. (FIG. 4).

While scrolling different menu(s) of the application, the questions and answers to be chosen, will be presented on the display of the mobile phone.

The selection of a menu item while the menu is running, occurs by pressing an in the software defined key or sequence of keys from the keypad of the mobile phone, for example by entering an item number. FIG. 2 shows an example of a state transition diagram and a menu structure.

Examples of location and menu structure of the application in case of implementation on a normal mobile phone: FIG. 4.

Examples of a menu content of the application: appendix 1,2

In order to enter into an event specific search cycle, the user scrolls through one or two different menu('s): for search and/or resident purposes. At every menu quantity, the user of the mobile phone selects one answer for example by entering an item number.

An illustrating example of the special data entry format:

<name> <phone#> <menu2...menuX....menuN> with
<name>= [CHARACTERset], <phone#>= [INTEGER],
<menuX>= [INTEGER]

After terminating a menu, the customized personal or business profile data will be build.

By entering the application again the user will be able to change the menu answers and so the profile data. Detecting received search data for example by adding data code:

A build format of the send, search data exist for example of encoded data containing the personal search profile of the sender. The build format of the resident data exist fro example of encoded data containing the personal profile of the user of the mobile phone. An example of a format of the encoded data:

```
<datacode><personal data><match data ><end code> with
<datacode>=<begin code><application code>,
<personal data > = <CHAR_name>,<INT_phone#>
<match data> = <INTmenu2:01...m,.........INTmenu_n:01...m>
```

Switching:

After terminating the last data entry, select for example 'OK' from the radio device's interface and next the mobile phone automatically switches to the short range radio mode and starts transmitting the search string and receiving other search strings with the same format from other mobile phones or radio devices, equipped with the identical software.

Filtering: Selecting the right receiving data by examination of the data code.

Matching: The matching of the resident profile data with the received search data.

If matching the mobile phone automatically switches to the normal cellular services mode and a message (image, sound and/or data) appears in the display. For a matching structure FIG. 6.

The user has the choice to dial the phone number from the message on the display of the mobile phone.

Low Level Software:

Low level software as those of the operating system (OS) of the mobile phone allows simultaneously running the application as well transmitting and receiving of cellular signals, automatically switching between normal mobile phone operating mode for cellular services and the short range radio mode if necessary (partially) controlled by the application. While in short range radio mode, normal cellular services stay might be available on interrupt basis, provided by the software of the operating system of the mobile phone.

Appendix 3 for a functional and technical impression.
Software:
Single Mode Solution:

The radio device X has in a short range radio mode both the capacity of sending specific data X from a menu driven, user-controlled, data entry method as well as receiving of specific data Y from, for example, radio device Y also equipped with the software for (business) partner search and selection in a local area.

Menu structure: After starting the application the first menu will appear on the display. (FIG. 5).

While scrolling different menu(s), the questions and answers to be chosen, will be presented on the display of the radio device.

The selection of a menu item while the menu is running occurs by pressing an in the software defined key or sequence of keys from the keypad of the radio device, for example by entering an item number.

FIG. 2 shows an example of a state transition diagram and a menu structure of the software.

An example of the location and menu structure in case of implementation on the single mode radio device: FIG. 5. Illustrating examples of a menu content of the application: appendix 1,2.

In order to enter into an event specific search cycle, the user fills out one or two different menu(s): for search and/or resident purposes. At every menu quantity the user of the radio device selects one answer, for example by entering an item number. An illustrating example of a data entry format::
<name> <phone#> <menu2 . . . menun> with > with <name>=[CHARACTERset], <phone#>=[INTEGER], <menuX>=[INTEGER].

After terminating a menu, the customized personal or business profile data will be build from the data entry. By entering the application again the user will be able to change the menu answers and so the profile data. Detecting received search data for example by adding data code:

A build format of the send, search data exist for example of encoded data containing the personal search profile of the sender. A build format of the resident data exist of encoded data containing the personal profile of the user of the radio device. An example of a format of the encoded data:

```
<datacode><personal data><match data>< endcode> with
<datacode>=<begin code><application code>,
<personal data> =<CHAR_name>, <INT_phone#>
<match data> = <INTmenu2:01...m,.........INTmenu_n:01...m>
```

Transceiving:

After terminating the last data entry, select for example 'OK' from the radio device's interface and next the radio device automatically starts transmitting the profile search string and receiving other profile search strings with the same format from other radio devices or other devices like mobile phones, equipped with the identical software.

Filtering: Selecting the right receiving data by examination of the data code.

Matching: The matching of the resident profile data with the received search data.

If matching a message (image, sound and/or data) appears on the display of the radio device.

For an example of the matching structure: FIG. 6.

The user has the choice to dial the phone number from the message on the display via a mobile or wired phone.

Low Level Software:

The operating system (OS) of the radio device allows short range radio transceiving if necessary (partially) controlled by the application.

Appendix 4 for a functional and technical impression.
Hardware:
Dual Mode Solution:

FIG. 3A shows an example of an hardware configuration in this example provided with a normal computer type of BUS as the data/command/address lines.

Components: The application has been stored/embedded as a utility program in mobile phone's memory for example (EP)ROM, implemented i.e. under 'functions', 'utilities' (business variant) or 'games' (private variant). As an option the application might be a part of the operating system (OS) of the mobile phone. The data of user's search and/or resident profiles will be stored in device's memory for example RAM memory. An (multitasking) operating system (OS) has been stored in the memory (ROM) of the mobile phone. The application will be executed by mobile phone's micro processor/ controller (CPU). After starting the application, the first menu will appear on the DISPLAY. (FIG. 4).

User controlled data entry via a KEYBOARD or numeric KEYPAD of the mobile phone.

The generally known mobile phone KEYPAD has for example been provided with keys like:

'OK' key for terminating the menu input and start transceiving profile data in a short range radio mode, data filtering, matching and messaging.

Square key # to stop the application any time (menu, transceiving, filtering, matching etc.), Clear key 'C' to change the menu input, Numeric keys '0', 1, 2abc, 3def, 4ghi, 5jkl, 6 nmo, 7pqrs, 8tuv, 9wxyz for input of the menu item choices Scroll keys '^' and 'v' to scroll to the next menu (item) while entering the menu choices, Function key 'F' for selecting the application from the function menu of the mobile phone.

Processing and Method:

In this example the processing of the input from the menu's occurs in mobile phone's micro processor/controller (CPU). The CPU builds the profile data from the menu driven input.

The profile data will be stored in the memory, for example RAM memory, of the mobile phone.

The CPU performs the data filtering and matching of the received search and resident profile data.

If matching, the CPU partially presents the profile data (output) in phone's DISPLAY as a message.

The menu driven input takes place via the normal mobile phone user interface (FIG. 1), existing of a normal KEYPAD and DISPLAY while answering questions from the application menu.

While finishing the last menu question regarding to the search data, phone's CPU will build the search profile data, ready for transmitting in the short range radio mode.

As an option, low level software as those of the OS of the mobile phone might enable simultaneously running the application as well transmitting and receiving of cellular signals, automatically switching between normal mobile phone operating mode for cellular services and the short range radio mode if necessary (partially) controlled by the application.

Supplementary:

The short range radio communication functions and technology might be implemented as an integral hard- and software part of the application.

The short range radio hard- and software may also be designed as a separate electronic micro-circuit (ACCESSORY) connected via a regular mobile phone data/command/address-BUS for example S-BUS type to the CPU and memory.

All hardware like CPU, ROM, RAM, ACCESSORY-card, SIM (Subscriber Identity Module)-card etc. has been connected via the data/command-BUS of the mobile phone.

The mobile phone has been equipped with an I/O port for example an Infrared or cable connection type RS-232 serial port. This I/O port enables the mobile phone to be connected with a computer device like a PC, for storing different variants of the special menu software (f.e. business, private etc.: event specific) in the memory of the device.

The different variants of the special menu software (business, private etc.: event specific) may also be wireless loaded by a, for example PC connected, local download device. (FIG. 7).

Hardware:

Single Mode Solution:

FIG. 3B shows an example of an hardware configuration in this example provided with a normal BUS as the data/command/address lines.

The short range radio device can also be provided with a normal data/command/address-BUS.

Components: The application has been stored/embedded in radio device's memory for example (EP)ROM type of memory. The application will be executed by radio device's micro processor/controller (CPU). The operating system (OS) has been stored in the memory (ROM) of the radio device.

After starting the application the first menu will appear on the DISPLAY. (FIG. 5).

User controlled data entry via a normal KEYBOARD or numeric KEYPAD. (FIG. 1) of the radio device.

A version of a KEYPAD might be provided with keys like:

On/Off switch, START/STOP key,

Scroll keys '^' and 'v' to scroll to the next menu (item) while entering menu choices, Numeric keys '0', 1, 2abc, 3def, 4ghi, 5jkl, 6 nmo, 7pqrs, 8tuv, 9wxyz for input of the menu item choices Clear key 'C', backspace 'OK' key for terminating the menu input and start transceiving profile data in the short range radio mode, data filtering, matching and if matching: messaging.

Processing and Method:

In this example the processing of the input from the menu's occurs in radio device's micro processor (CPU). The CPU builds the profile data from the menu driven input.

The profile data will be stored in the memory for example RAM type, of the radio device.

The CPU performs the data filtering and matching of the received search and resident profile data.

If matching, the CPU partially presents the profile data (output) in radio device's DISPLAY as a message.

The menu driven input takes place via normal the radio device user interface (FIG. 1), existing of KEYPAD and DISPLAY while answering questions from the application menu.

While finishing the last menu question regarding to the search data, and pressing the 'OK' key, radio device's CPU will build the search profile data ready for transmitting in the short range radio mode.

The OS of the radio device allows short range radio transceiving if necessary controlled by the application. All hardware like CPU, ROM, RAM, EPROM, RS-232 etc. has been connected via the regular data/command-BUS of the radio device.

Supplementary:

The radio device has been equipped with an I/O port for example an Infrared or cable connection type RS-232 serial port. This I/O port enables the radio device to be connected with a computer device like a PC, for storing different variants of the menu software (f.e. business, private etc.: event specific) in the memory of the device. The different variants of the menu software (business, private etc.: event specific) may also be wireless loaded by a, for example PC connected, local download device. (FIG. 7).

Appendix 1

Illustrating example of a private category content of the application software: Dating,

---

Menu1: Personal: Current Entry:

Enter name, phone number: Yes, press 1 No, press 0
Menu2: Matching % Entry:

1. Less then 20%
2. Between 20%-40%
3. Between 40%-60%
4. Between 60%-80%
5. Between 80%-100%
6. 100%

Menu2: Aim Entry:

1. Friendship
2. Love
3. Sex
4. Not important

Menu3: Sex Entry:

1. Male
2. Female
3. Not important

Menu4: Disposition Entry:

1. Hetero
2. Homo/Lesbian
3. Not important

Menu5: Color Entry:

1. Black
2. Brown,
3. White
4. Not important

Menu6: Hair Entry:

1. Black
2. Brown
3. Blond
4. Not important

Menu7 Eyes Entry:

1. Brown,
2. Blue
3. Other
4. Not important

Menu8: Age Entry:

1. 12-15
2. 16-19
3. 20-25
4. 25-30
5. etc.
6. Not important

Menu9: Height Entry:

1. etc.

Menu11: Children Entry:
Menu11: Education Entry:
Menu12: Work Entry:
Menu13: Sport Entry:
Menu14: Hobbies Entry:
etc.

---

Appendix 2

Illustrating example of a business category content of the application software: Computer branche

---

Menu1: Name, Phone# Current Entry:

Enter: name, phone number:
Menu2: Matching % Entry:

1. Less then 20%
2. Between 20%-40%
3. Between 40%-60%
4. Between 60%-80%
5. Between 80%-100%
6. 100%

Menu3: Industrie Entry:

1. Computer manufacturer
2. Software developer
3. Internet
4. Communications/Network
5. Other Menu4: Channel Entry:

1. Computer retailer/Dealer
2. OEM/Components
3. Systems integrator
4. Mass Merchandiser
5. Computer distributor/Wholesaler
6. Computer consultant
7. etc Menu5 Corporate Entry:

1. Non profit/Government
2. Publishing/Broadcasting
3. Telecommunications
4. PR/Advertising
5. Consumer electronics
6. Multimedia Products/Services
7. Engineering/Architecture/R&D
8. etc.

Menu6: Job Function Entry:

2. Engineering
3. R&D
4. Systems/Software
5. Marketing/Sales
6. Management
7. Finance
8. Staff
9. etc.

Menu7: Title Entry:

1. President/CEO/Owner
2. Vice President
3. Director
4. Technical management
5. etc.

Menu8: Product interest Entry:

etc.
Menu9: Company size Entry:

etc.
Menu10: Investment size Entry:

etc.
Menu11: Aim Entry:

1. Buy
2. Sale
3. Take-over
4. Collaboration

Appendix 3
Functional And Technical Explanation:
Pre Conditions
  Device 1 and device 2 are similarly equipped with
  a) The application software stored in the memory of the portable mobile phone and
  b) an additional dual mode system for automatically switching between the normal cellular services in the usual mobile frequency bands and short-range radio communication (dual mode solution).

For understanding, in this example device1 behaves as the transmitter and device2 behaves as the receiver.
Device1 shows the data input process and data transceiving,
Device2 has already the application data ready for transmitting.
Device2 shows the data receive, matching and display process.

Both devices cope with n−1 devices while in this example only the transmitted data of device x matches with the resident data of device 2 and reverse.

User controlled input and displaying via the normal mobile phone user interface.

---

Device 1
In GSM mode
Select the application function
The application running
Enter/change data Y/N?
If enter data then Check private or business search and/or resident profile
Menu1: Enter name/phone#
Menu 2 : matching % −> item2
Menu 3 −> item3
-
.
Menu n −> itemn
If EndOfMenu then Build charstringdev1
Automatically switch to short range radio mode
Do while not (stop or match) Send charstringdev1
Do while not (stop or match) Receive charstringdev2..n
Device 2
In GSM mode
Select the application function
The application running
Enter/change data Y/N?
If already entered data then start short range radio mode Y/N?
If start do while not (stop or match) Send charstringdev2
If start do while not (stop or match) Receive charstringdev1,3..n
Match received charstringdev1,3..n with personal/resident charstringdev2
If match then automatically switch to GSM-mode
display <name/phone#> from charstringdev_x (x ∈ 1,3......n)
Call phone# Y/N ?
If call then dial displayed phone number.

---

Appendix 4
Functional and Technical Explanation:
Pre Conditions
  Device 1 and device 2 are similarly equipped with
  a) the application software stored in the memory of the portable radio device and
  b) functions and technology for short-range radio communication (single mode solution).

For understanding, in this example device1 behaves as the transmitter and device2 behaves as the receiver. Device1 shows the data input process while device2 has already the application data ready for transmitting. Device2 shows the data receive, matching and display process.

Both devices cope with n−1 devices while in this example only the transmitted data of device x matches with the resident data of device 2 and reverse.

User controlled input and displaying via known user interface.

---

Device 1
Start application function
In the application menu's
Enter/change data Y/N?
If enter data then Check private or business
Menu1: Enter name/phone#
Menu 2 : matching % −> item2
Menu 3 −> item3
-
-
.
.
Menu n −> itemn
If EndOfMenu then Build charstringdev1
Short range radio data transceiving
Do while not (stop or match) Send charstringdev1
Do while not (stop or match) Receive charstringdev2..n
Device 2
Start the application
Enter/change data Y/N?
If already entered data then start transceiving in short range radio mode Y/N?
If start do while not (stop or match) Send charstringdev2
If start do while not (stop or match) Receive charstringdev1,3..n
Match received charstringdev1,3..n with personal/resident charstringdev2
display <name/phone#> from charstringdevx (x ∈ 1,3......n)

---

The invention claimed is:

1. A user communication device, comprising:
  a transceiver for operating said user communication device in at least one wireless communication mode in a wireless communications network,
  an input for inputting user-specific personal profile data,
  an output for providing a message,
  a data memory for storing application and profile data, and
  a data processor for controlling said user communication device, wherein said data memory comprises a software application to be executed by said data processor, said software application, when executed by said data processor, is arranged for:
  building a customized encoded data string comprising user-specific personal profile data provided at said input,
  storing said customized encoded data string in said memory, said customized encoded data string being stored in said memory of said user communication device adapted to be accessible under control of said software application,
  automatically transmitting, by said transceiver, said customized encoded data string directly as a whole to a plurality of user communication devices in said wireless communications network comprising said software application,
  automatically receiving, by said transceiver, customized encoded data strings transmitted directly and as a whole by said plurality of user communication devices in said wireless communications network comprising said software application,
  storing received customized encoded data strings in said memory, said received customized encoded data strings being stored in said memory of said user communication device adapted to be accessible under control of said software application,
  searching and matching, by said software application in said user communication device, received customized encoded data strings stored in said memory and said customized encoded data string, and automatically providing a message, by said software application in said user communication device, at said output based on said searching and matching by of said customized encoded data strings.

2. The device according to claim 1, wherein said software application is arranged for providing direct, real time, personal contact in a local area upon matching of said stored and received customized encoded data strings and said customized encoded data string.

3. The device according to claim 1, wherein said message includes at least one of an image, sound and data.

4. The device according to claim 1, wherein said software application includes a menu structure for menu driven data entry at said input.

5. The device according to claim 1, wherein said software application includes an event specific, automatically adapted menu structure and content for menu driven data entry at said input.

6. The device according to claim 1, wherein said input is arranged for data entry comprising at least one of keypad, image and speech data.

7. The device according to claim 1, wherein said memory comprises a Read Only Memory, ROM, and a Random Access Memory, RAM, wherein said software application is stored in said ROM and said customized encoded data strings are stored in said RAM.

8. The device according to claim 1, wherein said customized encoded data string includes at least one of personal data including user name and telephone number, business data, and search profile data build from data provided at said input.

9. The device according to claim 1, wherein said transceiver is arranged for operating in a cellular wireless communication mode and said software application is arranged for automatically switching said transceiver to said cellular wireless communication mode upon matching of said stored and received customized encoded data strings.

10. The device according to claim 1, wherein said software application includes filtering of received customized encoded data strings.

11. The device according to claim 1, wherein said message, upon matching of said stored and received customized encoded data strings, includes a telephone number for direct personal contact.

12. The device according to claim 1, wherein said software application includes an event specific, automatically adapted menu structure and content downloaded from a download device.

13. The device according to claim 1, wherein said transceiver is arranged for operating in a first cellular wireless communication mode and for operating in a second short range wireless communication mode, wherein said software application is arranged for transmitting and receiving said customized encoded data strings by said transceiver operating in said second communication mode directly with a plurality of transceivers.

14. The device according to claim 1, wherein said device is equipped for operating as one of a group comprising a walkie-talkie, semaphone, mobile phone, pager, Personal Digital Assistant, laptop, handheld personal computer, and palmtop personal computer.

15. The device according to claim 1, wherein said user-specific personal profile data provided at said input comprises a resident profile data type and a search profile data type, wherein said customized encoded data string for transmitting to said plurality of user communication devices is build comprising said search profile data type, and wherein said customized encoded data string for searching and matching received customized encoded data strings is built from said resident profile data type.

16. The device according to claim 1, wherein said transceiver is arranged for operating in a cellular wireless communication mode, said device, comprising a further transceiver arranged for operating in a short-range wireless communication mode, said further transceiver connecting externally to said device, wherein said software application is arranged for transmitting and receiving said customized encoded data strings by said further transceiver.

17. The device according to claim 1, comprising a transceiver arranged for operating in a short-range wireless communication mode, wherein said software application is arranged for transmitting and receiving said customized encoded data strings by said transceiver operating in multipoint to multipoint communication.

18. The device according to claim 1, wherein said transceiver is arranged for operating in a first cellular wireless communication mode and for operating in a second short-range wireless communication mode, wherein said software application is arranged for switching said transceiver to said cellular wireless communication mode when transmitting and receiving in said second short-range wireless communication mode.

19. A system comprising a plurality of user communication devices, each user communication device comprising:
a transceiver for operating said user communication device in at least one wireless communication mode in a wireless communications network,
an input for inputting user-specific personal profile data,
an output for providing a message,
a data memory for storing application and profile data, and
a data processor for controlling said user communication device, wherein said data memory comprises a software application to be executed by said data processor, said software application, when executed by said data processor, is arranged for:
building a customized encoded data string comprising user-specific personal profile data provided at said input,
storing said customized encoded data string in said memory, said customized encoded data string being stored in said memory of said user communication device adapted to be accessible under control of said software application,
automatically transmitting, by said transceiver, said customized encoded data string directly as a whole to a plurality of user communication devices in said wireless communications network comprising said software application,
automatically receiving, by said transceiver, customized encoded data strings transmitted directly and as a whole by said plurality of user communication devices in said wireless communications network comprising said software application,
storing received customized encoded data strings in said memory, said received customized encoded data strings being stored in said memory of said user communication device adapted to be accessible under control of said software application,
searching and matching, by said software application in said user communication device, received customized encoded data strings stored in said memory and said customized encoded data string, and automatically providing a message, by said software application in said user communication device, at said output based on said searching and matching of said customized encoded data strings.

20. The system according to claim 19, wherein said received customized encoded data strings stored in said memory of each user communication device of said system comprise a distributed database, said distributed database being accessible with authorized access of said software application.

21. A communication device for partner search and selection comprising:
a user input interface for user controlled entry of user-specific personal data,
a memory for storing entered user-specific personal data,
a display for displaying a message,
a radio transceiver for operating the communication device in at least one communication mode for transceiving user-specific personal data, and
a microprocessor or controller or CPU,
wherein the device comprises a software application for partner search to be executed by the microprocessor or controller or CPU, wherein the radio transceiver is configured for multi-point to multi-point communication in a local area in which N communication devices transmit data to N−1 other communication devices and receive data from N−1 other communication devices, each of the N communication devices is equipped for said partner search and selection and N is an integer equal to or greater than three, and the user input interface is configured for entering user-specific personal data comprising personal or business profile data and search profile data, and wherein the application when executed by the microprocessor or controller or CPU, is configured for:
building, from the user-specific personal data, a customized encoded data string comprising personal or business profile data and search profile data,
building, from the user-specific personal data, resident profile data comprising personal or business profile data and match data,
storing the resident profile data in the memory forming a distributed database being accessible under control of the software application,
automatically transmitting, by the transceiver, the customized encoded data string as a whole to the N−1 other communication devices in the local area, the transmitted customized encoded data string comprising personal or business profile data and search profile data,
automatically receiving, by the transceiver, customized encoded data strings comprising personal or business profile data and search profile data transmitted as a whole by the N−1 other communication devices in the local area,
storing received customized encoded data strings in said memory forming a distributed database adapted to be accessible under control of said software application,
matching, by said software application in said user communication device, search profile data of a received customized encoded data string and the resident profile data stored in the memory, and
automatically displaying, by said software application in said user communication device, a message at the display comprising personal or business profile data from said received customized encoded data string, upon matching.

22. The device of claim 21, wherein the personal or business profile data in the customized encoded data string comprises name and telephone number, and wherein the message displayed at the display comprises the name and telephone number of the matched and received search profile data.

23. The device of claim 22, wherein the communication device is configured with a communication mode for cellular services, and wherein the application is adapted for automatically switching from the communication mode for cellular services to the communication mode for multi-point to multi-point communication in the local area, and wherein the application is adapted for automatically switching-back to the cellular services upon matching of received search profile data and resident profile data, and if the user agrees, for dialing the telephone number from the message.

24. The device of claim 21, wherein the software application further comprises an algorithm for filtering of the received data strings.

25. The device of claim 21, wherein the software application further comprises a menu structure and content or a variety of menu structures and contents, and event specific, automatically adapted menu content for user controlled entry of the user-specific data.

26. The device of claim 25, further comprising a cable connection type I/O port and/or wherein the device is configured for wirelessly downloading and storing in the memory of different variants of menu software of the application.

27. The device of claim 21, wherein the functions and technology for communication in said local area are implemented as an integral hard- and software part of the application or as a separate electronic micro-circuit connected via a regular mobile phone data/command/address-BUS for example S-BUS type or a regular computer type of BUS to the microprocessor or controller or CPU and memory.

28. The device of claim 21, configured as a device selected from the group comprising a portable wireless communication device, a walkie-talkie, a semaphone, a mobile phone, a pager, Personal Digital Assistant, a laptop, a handheld personal computer, and a palmtop personal computer.

29. A system comprising at least three of the communication devices according to claim 21.

30. The system according to claim 29, wherein the communication devices have functions for regular Internet access of a Personal Partner Assistant, PPA, website adapted for submitting a user ID and password and for providing the user-specific data.

* * * * *